United States Patent [19]

Knudson

[11] 4,106,269
[45] Aug. 15, 1978

[54] ADJUSTABLE GROUND ROLLER FOR MOWER

[75] Inventor: Henry T. Knudson, Grafton, Wis.

[73] Assignee: Allis-Chalmers Corporation, Milwaukee, Wis.

[21] Appl. No.: 755,464

[22] Filed: Dec. 30, 1976

[51] Int. Cl.$^2$ ............................................. A01D 55/32
[52] U.S. Cl. ................................. 56/15.8; 56/DIG. 22
[58] Field of Search ............... 56/DIG. 22, 15.8, 16.3, 56/15.9, 16.7, 16.9, 11.6

[56] References Cited

U.S. PATENT DOCUMENTS

| 3,550,364 | 12/1970 | Musgrave | 56/15.8 |
| 3,654,749 | 4/1972 | Ostergren et al. | 56/15.8 |
| 3,706,186 | 12/1972 | Hurlburt | 56/15.8 |

*Primary Examiner*—Russell R. Kinsey
*Attorney, Agent, or Firm*—Charles L. Schwab

[57] ABSTRACT

Side-to-side leveling of a mower is facilitated by a two part lever connected to a ground roller axle. The ground rollers are rotatably mounted on a single horizontal transverse axle which in turn is connected to the rear of the mower housing through a pair of laterally spaced arms secured to a transverse rock shaft. One of the arms includes a first part rigidly secured to the transverse rock shaft and a second part which is pivotally connected to the transverse rock shaft and connected to the first part by a bolt and nut. The part rigidly secured to the rock shaft includes a slot through which the bolt extends which permits the second arm part to be angularly adjusted about the rock shaft axis relative to the first arm part. This permits one end of the roller axle to be adjusted vertically relative to the other end.

5 Claims, 4 Drawing Figures

U.S. Patent  Aug. 15, 1978  4,106,269
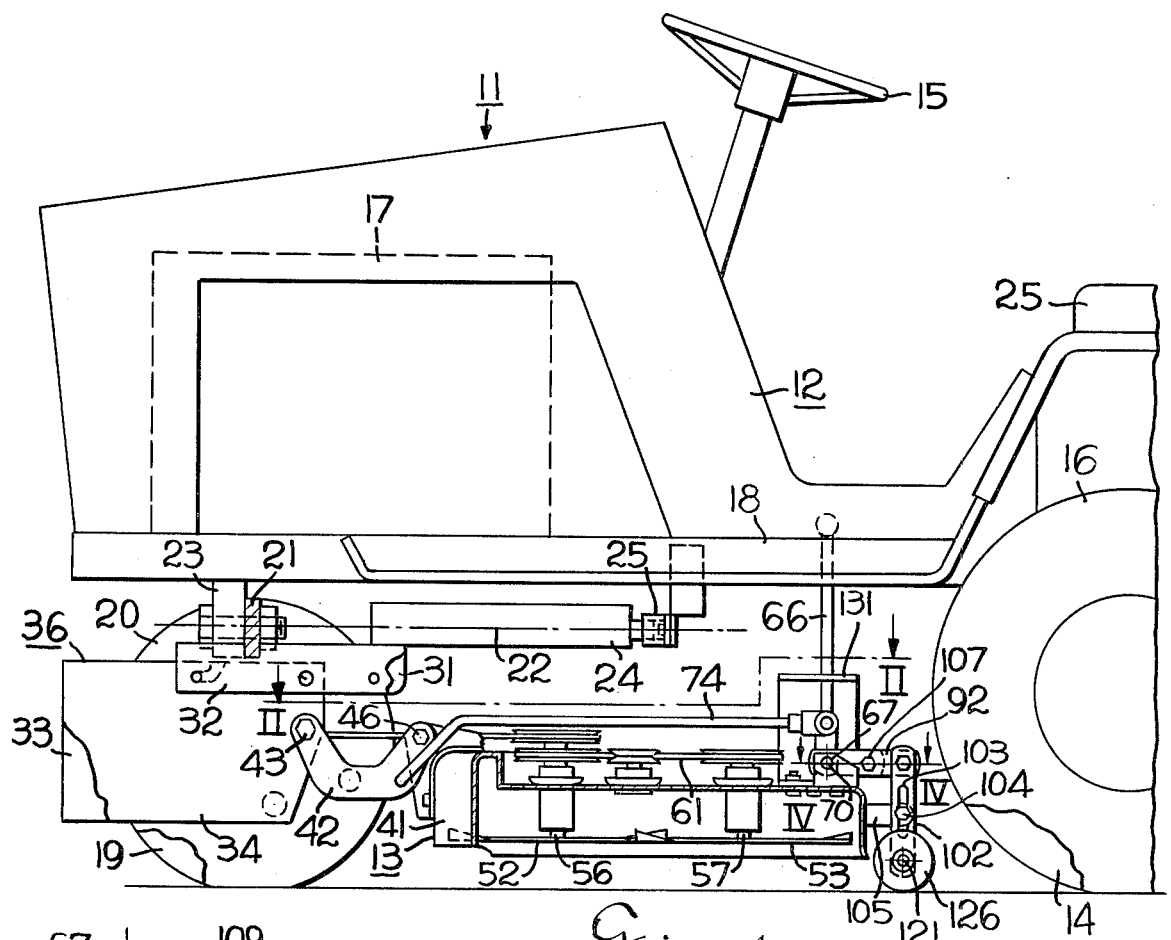
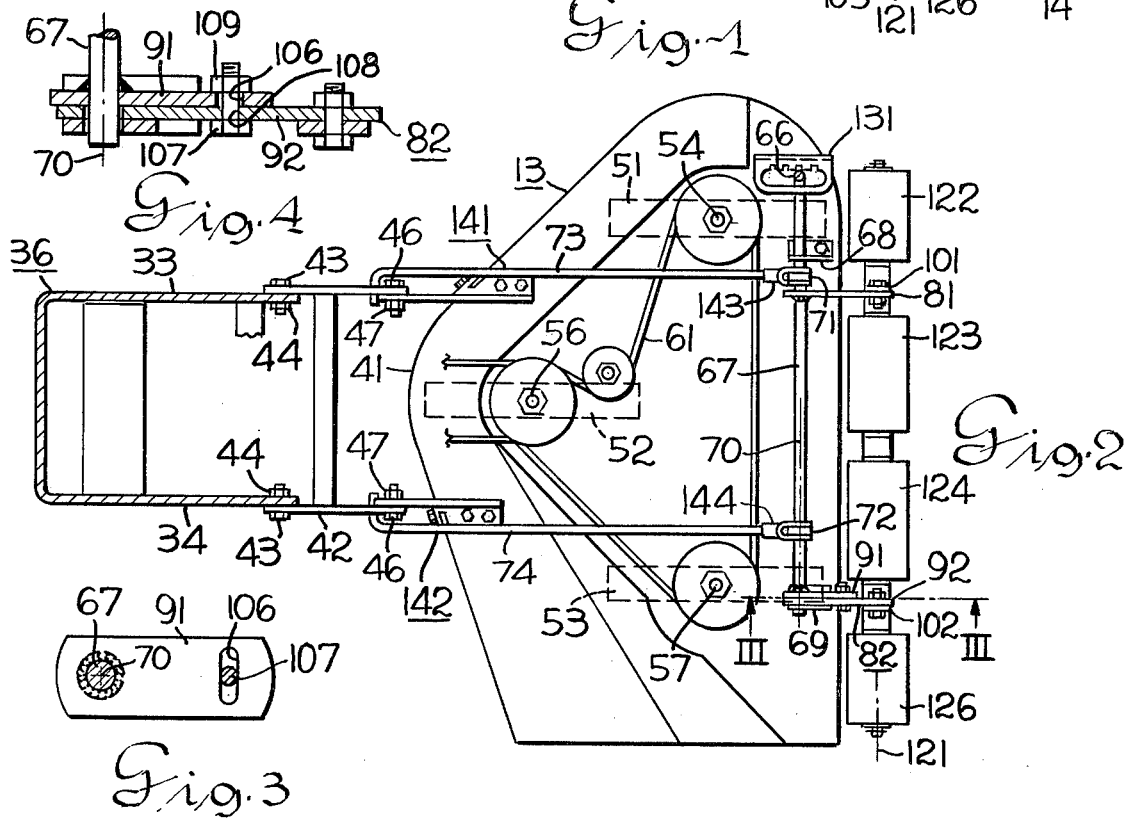

ADJUSTABLE GROUND ROLLER FOR MOWER

BACKGROUND OF THE INVENTION

Heretofore, a side-to-side leveling adjustment has been provided for a multiple spindle lawn mower wherein two separate rock shafts mounting laterally spaced ground wheels are disposed on parallel axes spaced from one another in the fore to aft direction. In the prior art construction, arms extending upwardly from adjacent inboard ends of the rock shafts are interconnected by an adjustable link thereby permitting the arm of one rock shaft to be adjusted angularly in relation to the arm of the other rock shaft.

BRIEF DESCRIPTION OF THE INVENTION

The ground rollers supporting the rear of the mower housing are raised and lowered relative to the mower housing so as to adjust the height of cut by a mechanism including a transverse shaft pivotally mounted on the top of the mower housing and having rearwardly extending arms, the free ends of which are connected to the roller axle by a pair of vertical links. In order to provide side-to-side adjustment of the height of cut of the mower, one of the arms is made in two parts with one part including a slot and the other part including an opening for a bolt. One of the arm parts is rigidly secured to the transverse shaft and the other arm part has an end pivotally connected to shaft. In order to make a side-to-side or lateral leveling adjustment of the mower housing, the nut on the bolt passing through the slot is loosened, the two parts of the arm are angularly adjusted relative to one another a sufficient amount to laterally level the mower housing and then the nut is retightened.

BRIEF DESCRIPTION OF THE DRAWINGS

One embodiment of the present invention is shown in the attached sheet of drawings in which:

FIG. 1 is a side view of a riding tractor with parts broken away to better illustrate the present invention;

FIG. 2 is a section view taken along the line II—II in FIG. 1;

FIG. 3 is a section view taken along the line III—III in FIG. 2; and

FIG. 4 is a section view taken along the line IV—IV in FIG. 1.

DETAILED DESCRIPTION OF THE DRAWINGS

Referring to the drawings, a riding mower 11 comprises a combination of a tractor 12 and an underslung mower unit 13. The tractor 12 includes a steering wheel 15, an operator's seat 25, and a pair of rear drive wheels 14, 16 which are connected by an appropriate drive train (not shown) to an engine 17 carried on the front of the main frame 18. The front of the main frame 18 is supported by a pair of steerable wheels 19, 20 mounted on a transverse axle 21. The axle 21 is pivotally secured on a longitudinal axis 22 to a downwardly extending bracket 23 of the tractor frame 18. A rearwardly extending part 24 of the axle 21 is journaled in a bracket 25 on the same axis 22. The front axle 21 includes a pair of downwardly opening channels 31, 32 which are connected respectively to the side walls 33, 34 of a mounting subassembly 36 of the mower unit 13.

The housing 41 of the mower unit 13 is connected at its front end to the mounting subassembly 36 by a link structure 42. The front of the link structure 42 is pivotally connected to the subassembly 36 by a pair of bolts 43 and nuts 44. The rear of the link structure 42 is pivotally connected to forwardly extending brackets at the front of the mower housing 41 by a pair of bolts 46 and nuts 47. The mower unit 13 includes three cutting blades 51, 52, 53 secured to vertical spindles 54, 56, 57, the upper ends of which carry V-belt sheaves engaged by a drive belt 61. The mower housing 41 is raised and lowered by a manually operated control which includes an operator's handle or lever 66 which is secured at its lower end for pivotal movement with a rock shaft 67 mounted on the rear top of the mower housing 41 by a pair of bearing brackets 68, 69 for pivotal movement about a transverse pivot axis 70. The rock shaft 67 includes a pair of upstanding arms 71, 72 to which a pair of horizontal links 73, 74 are pivotally connected. The front ends of the longitudinally extending links 73, 74 are pivotally connected to laterally opposite sides of the link structure 42.

The rock shaft 67 also carries an arm 81 which is rigidly secured thereto as by welding and a two part arm assembly 82 which is transversely spaced from arm 81. The arm assembly 82 comprises two side-by-side parts. The first part 91 is rigidly secured as by welding to the rock shaft 67 and the second part 92 is pivotally mounted at its front end on the rock shaft 67 for pivotal movement about its axis 70. A pair of vertical links 101, 102 are pivotally connected to the rear ends of the arm 81 and the arm 92 and the links 101, 102 each include a vertical slot which slidingly receive a guide member secured to the rear of the mower housing 41. As shown in FIG. 1, the vertical link 102 includes a vertically extending slot 103, through which the shank of a guide bolt 104 extends. The guide bolt 104 is rigidly secured to a rearwardly extending bracket 105 on the mower housing 41. The lower ends of the vertical links 101, 102 are connected to a transverse roller axle 121 on which four ground rollers 122, 123, 124, 126 are rotatably mounted. The first arm part 91, as shown in FIG. 3, includes a vertically extending slot 106 which is spaced radially from the rock shaft and through which a bolt 107 extends. As shown in FIG. 4, the bolt 107 extends through an opening 108 in the second arm part 92 and the two parts 91, 92 are secured to one another upon tightening of a nut 109 on the bolt 107.

The mower housing 41 is lowered and raised by swinging the control lever 66 forward or rearward, respectively, in its control quadrant 131. In order to obtain a level cut during a mowing operation, the mower should be leveled in its fore and aft direction and in its side-to-side direction. Fore and aft leveling is achieved by threading the threaded rear ends of the rod components 141, 142 of links 73, 74 in or out of the clevis parts 143, 144. Side-to-side leveling is accomplished by loosening the nut 109 on bolt 107, adjusting the angular relationship between the arm parts 91 and 92, and then retightening the nut 109. The angular or pivotal movement of arm part 92 relative to arm part 91 about axis 70 is permitted by the adjustable connection between the arms provided by releasable fastening means in the form of slot 106 and bolt 107. By pivotally mounting the arm part 92 on the rock shaft 67 only one releasable fastening connection need be provided, namely that provided by the bolt 107 and the nut 109. The stub arm 91 and its slot 106 permits the arm part 92 to be angularly adjusted relative to the rock shaft 67 and thus relative to the arm 81. By adjusting the angular position of the arm or arm part 92 relative to the arm 81 the mower housing can be leveled from one lateral side to the other. This adjustment is referred to as side-to-side leveling of the mower. As is apparent from the foregoing description, the side-to-side adjustment of the mower is easily made with ordinary tools and the mechanism for achieving the adjustment is relatively inexpensive and is accessible for initial mower setup as well as subsequent adjustment.

The embodiments of the invention in which an exclusive property or privilege is claimed are defined as follows:

1. In combination with a mower including a housing for blade means, a side-to-side leveling mechanism comprising a rock shaft mounted on said housing for pivotal movement about an axis extending transverse to the direction of movement of said housing during a mowing operation, a manual control level connected to said rock shaft, transversely spaced ground rollers adjacent one of the fore and aft sides of said housing, a pair of arms secured to transversely spaced points of said rock shaft for swinging movement therewith and connected to said rollers, one of said arms having first and second angularly adjustable parts in side-by-side relation to one another, said first part being rigidly secured to said rock shaft, and fastening means releasably securing said parts together, said parts being angularly adjustable relative to one another upon loosening of said fastening means.

2. The combination of claim 1 wherein one of said parts presents a slot spaced radially from said rock shaft and said fastening means includes a bolt connected to the other of said parts and extending through said slot.

3. The combination of claim 2 wherein said one part is said first part.

4. The combination of claim 2 wherein said second part is pivotally connected to said rock shaft.

5. The combination of claim 1 wherein said second part is pivotally connected to said rock shaft.

* * * * *